United States Patent
Tsuchiya et al.

(10) Patent No.: US 11,513,265 B2
(45) Date of Patent: Nov. 29, 2022

(54) LIGHT BODY

(71) Applicant: HONDA MOTOR CO., LTD., Tokyo (JP)

(72) Inventors: Yuji Tsuchiya, Wako (JP); Daisuke Nakashima, Wako (JP); Shunsuke Iwao, Wako (JP); Masayoshi Takori, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/110,997

(22) Filed: Dec. 3, 2020

(65) Prior Publication Data

US 2021/0173131 A1 Jun. 10, 2021

(30) Foreign Application Priority Data

Dec. 5, 2019 (JP) .............................. JP2019-220451

(51) Int. Cl.
*G02B 5/08* (2006.01)
*G02B 5/10* (2006.01)

(52) U.S. Cl.
CPC ............. *G02B 5/0808* (2013.01); *G02B 5/10* (2013.01)

(58) Field of Classification Search
CPC .................................. G02B 5/0808; G02B 5/10
USPC ................... 359/839, 629, 636, 638
See application file for complete search history.

(56) References Cited

U.S. PATENT DOCUMENTS

| | | | | |
|---|---|---|---|---|
| 1,509,936 A | * | 9/1924 | Douglass | G02B 27/143 359/834 |
| 3,668,406 A | * | 6/1972 | Reid | G01J 9/02 356/13 |
| 4,040,726 A | * | 8/1977 | Paca | G02B 27/143 359/636 |

(Continued)

FOREIGN PATENT DOCUMENTS

| | | |
|---|---|---|
| CN | 1607353 A | 4/2005 |
| CN | 101131539 A | 2/2008 |

(Continued)

OTHER PUBLICATIONS

Search Report dated Jul. 14, 2021 corresponding to German Patent Application No. 10 2020 131 944.4, and English translation thereof.

(Continued)

*Primary Examiner* — Ricky D Shafer
(74) *Attorney, Agent, or Firm* — Squire Patton Boggs (US) LLP

(57) ABSTRACT

A method for producing a half mirror includes forming a reflection region by which light is reflected and a transmission region through which the light is transmitted on a surface of a transparent plate Only the reflection region is coated with a plating. The coating includes a masking step of coating a position of the transparent plate corresponding to the transmission region with a masking material, a plating step of coating the entire surface which includes the transmission region which has been coated with the masking material and the reflection region with the plating, a plating removing step of removing the plating to a depth in which the masking material is exposed after the plating step, and a masking material removing step of removing the masking material after the plating removing step.

2 Claims, 4 Drawing Sheets

(56) References Cited

U.S. PATENT DOCUMENTS

| | | | | |
|---|---|---|---|---|
| 5,155,623 | A | * 10/1992 | Miller | G02B 27/283 359/489.09 |
| 5,243,465 | A | * 9/1993 | Fein | G02B 27/143 359/636 |
| 5,589,979 | A | * 12/1996 | Martin | G03B 21/00 359/449 |
| 7,006,549 | B2 | * 2/2006 | Anikitchev | G02B 27/09 372/107 |
| 9,677,735 | B2 | * 6/2017 | Hardy | F21S 43/31 |
| 10,458,910 | B2 | 10/2019 | Huang et al. | |
| 11,137,127 | B2 | * 10/2021 | Tsuchiya | F21S 43/239 |
| 2003/0227781 | A1 | * 12/2003 | Mochizuki | B60Q 1/2607 362/544 |
| 2005/0078486 | A1 | * 4/2005 | Kawaguchi | F21S 43/40 362/494 |
| 2008/0199638 | A1 | 8/2008 | Lin et al. | |
| 2011/0149585 | A1 | * 6/2011 | Dubosc | F21V 13/10 362/519 |
| 2015/0062946 | A1 | * 3/2015 | Fukai | F21S 43/40 362/516 |
| 2019/0107727 | A1 | 4/2019 | Gorelik et al. | |
| 2019/0120758 | A1 | 4/2019 | Huang et al. | |
| 2020/0142101 | A1 | * 5/2020 | Shim | G02B 27/144 |

FOREIGN PATENT DOCUMENTS

| | | | |
|---|---|---|---|
| JP | 10-260304 | A | 9/1998 |
| JP | 2005055762 | * | 3/2005 |
| JP | 2005-157070 | A | 6/2005 |
| JP | 2010-122354 | A | 6/2010 |
| JP | 2013-023088 | A | 2/2013 |
| JP | 2018045907 | * | 3/2018 |
| TW | 200732790 | A | 9/2007 |

OTHER PUBLICATIONS

Notice of Reasons for Rejection dated Feb. 15, 2022 corresponding to Japanese Patent Application No. 2019-220451 with English translation thereof.

Office Action dated Jun. 28, 2022 corresponding to Chinese Patent Application No. 202011391216.7, with partial English translation thereof.

Notice of Reasons for Rejection dated Aug. 30, 2022 corresponding to Japanese Patent Application No. 2019-220451, with English translation thereof.

* cited by examiner

LIGHT BODY

CROSS-REFERENCE TO RELATED APPLICATION

Priority is claimed on Japanese Patent Application No. 2019-220451, filed Dec. 5, 2019, the content of which is incorporated herein by reference.

BACKGROUND OF THE INVENTION

Field of the Invention

The present invention relates to a method for producing a half mirror and a lighting body.

Description of Related Art

In the related art, for reflecting members configured to reflect light from light sources, various techniques for forming a reflecting surface by performing plating on surfaces of members have been proposed.

For example, Patent Document 1 (Japanese Unexamined Patent Application, First Publication No. 2010-122354) describes a constitution of a reflecting member which includes a plastic base material having palladium fine particles dispersed therein, a nickel-phosphorus film grown using the palladium fine particles as catalyst nuclei, a nickel-containing film formed on the nickel-phosphorus film, and a silver-containing film formed on the nickel-containing film.

According to the technique disclosed in Patent Document 1, since palladium fine particles are dispersed in a plastic base material which is usually difficult to adhere to a metal film and a nickel-phosphorus film is grown using the palladium fine particles as catalyst nuclei, it is possible to form a silver-containing film on the plastic base material. Thus, it is possible to obtain a reflecting member in which the plastic base material is utilized and a high specular reflectance can be maintained for a long period of time.

SUMMARY OF THE INVENTION

Incidentally, a half mirror may be formed, for example, by performing plating on a transparent plate such as a glass plate in some cases. In a half mirror in the related art, the transmittance of the half mirror is set by controlling a film thickness of a plating to be vapor-deposited. However, in the related art in which the transmittance is set by controlling the film thickness of the plating, there is a concern regarding a difficulty in controlling film thickness and a decrease in manufacturability.

An object of the present invention is to provide a method for producing a half mirror in which the transmittance can be easily set and the manufacturability can be improved and a lighting body including a half mirror produced through this method.

A method for producing a half mirror and a lighting body according to the present invention have the following constitutions.

(1) A method for producing a half mirror according to an aspect of the present invention (for example, a method for producing a half mirror 1 in an embodiment) includes: forming a reflection region (for example, a reflection region A1 in the embodiment) by which light (for example, light L in the embodiment) is reflected and a transmission region (for example, a transmission region A2 in the embodiment) through which the light is transmitted on a surface (for example, a surface 2a in the embodiment) of a transparent plate (for example, a transparent plate 2 in the embodiment); and coating only the reflection region with a plating (for example, a plating 8 in the embodiment).

(2) A method for producing a half mirror (for example, a half mirror 1 in an embodiment) according to an aspect of the present invention (for example, a method for a half mirror 1 in the embodiment) includes: forming a reflection region (for example, a reflection region A1 in the embodiment) by which light (for example, light L in the embodiment) is reflected and a transmission region (for example, a transmission region A2 in the embodiment) through which the light is transmitted on a surface (for example, a surface 2a in the embodiment) of a transparent plate (for example, a transparent plate 2 in the embodiment); and coating only the reflection region with a plating (for example, a plating 8 in the embodiment); wherein the transmission region is formed in a lattice shape and a width (for example, a width w in the embodiment) of the transmission region and a pitch (for example, a pitch p in the embodiment) of the reflection region are set to predetermined values so that the transmittance of the half mirror has a predetermined value.

(3) The method for producing a half mirror according to the aspect of (1) or (2) includes: a masking step of coating a portion of the transparent plate corresponding to the transmission region with a masking material (for example, a masking material 7 in the embodiment); a plating step of coating the entire surface which includes the transmission region which has been coated with the masking material and the reflection region with the plating; a plating removing step of removing the plating to a depth at which the masking material is exposed after the plating step; and a masking material removing step of removing the masking material after the plating removing step.

(4) A lighting body according to an aspect of the present invention (for example, a lighting body 10 in an embodiment) includes: a half mirror (for example, a half mirror 1 in the embodiment) produced through the method for producing a half mirror according to any one of (1) to (3) described above; a light source (for example, a light source 13 in the embodiment); a light guide body (for example, a light guide body 14 in the embodiment) configured to guide light (for example, light L in the embodiment) from the light source to cause a light emitting surface (for example, a light emitting surface 5 in the embodiment) to emit light; and a reflector (for example, a reflector 15 in the embodiment) arranged to face the half mirror and configured to reflect the light toward the light emitting surface side.

According to the aspect of (1), it is possible to produce a half mirror by performing plating only on a portion of a surface of the transparent plate corresponding to a reflection region. Thus, it is possible to reduce time and effort required to control the film thickness compared with the related art in which a half mirror is produced by controlling a film thickness of the plating formed on the entire surface of the transparent plate. For example, it is possible to easily set the transmittance of a half mirror by changing an area ratio between transmission regions and reflection regions. Therefore, it is possible to provide a method for producing a half mirror in which the transmittance can be easily set and the manufacturability can be improved.

According to the aspect of (2), it is possible to produce a half mirror by performing plating only on a portion of a surface of the transparent plate corresponding to a reflection region. Thus, it is possible to reduce time and effort required to control the film thickness compared with the related art in which a half mirror is produced by controlling a film thickness of the plating formed on the entire surface of the transparent plate. The transmission region is formed in a lattice shape. In addition, it is possible to set the transmittance of a half mirror to a predetermined value by setting a width of the transmission region and a pitch of neighboring reflection regions to have predetermined values. Thus, it is possible to easily set the transmittance through a simple method.

Therefore, it is possible to provide a method for producing a half mirror in which the transmittance can be easily set and the manufacturability can be improved.

According to the aspect of (3), a half mirror is produced by being subjected to a masking step, a plating step, a plating removing step, and a masking material removing step. Since a plating is scraped off to a depth in which a masking material is exposed in the plating removing step, it is not necessary to maintain high processing accuracy at the time of removing the plating. Thus, it is possible to simplify a manufacturing device and easily perform an operation compared with the related art in which highly accurate film thickness control is required. When an area of a region coated with a masking material (that is, the next transmission region) is changed, it is possible to produce a half mirror having a predetermined transmittance. Thus, it is possible to produce a method for producing a half mirror in which the transmittance can be easily set and the manufacturability can be improved.

According to the aspect of (4), a lighting body includes a half mirror produced through the method for producing a half mirror described above, a light source, a light guide body, and a reflector. Since the half mirror and the reflector are arranged to face each other, light incident on the reflector from a light source via the light guide body is reflected between the reflector and the half mirror a plurality of times. At this time, a part of the light which has reached the half mirror is transmitted through a transmission region and causes a light emitting surface to emit light. The remaining part of the light which has reached the half mirror is reflected by a reflection region and reflected again by the reflector. In this way, light is transmitted through the half mirror at a predetermined transmittance and light is reflected between the reflector and the half mirror a plurality of times. Thus, it is possible to provide a sense of depth to light displayed on the light emitting surface. Thus, it is possible to provide a lighting body which includes a half mirror produced through a method for producing a half mirror in which the transmittance can be easily set and the manufacturability can be improved and in which a sense of depth can be expressed effectively.

DETAILED DESCRIPTION OF THE INVENTION

An embodiment according to the present invention will be described below with reference to the drawings.

Embodiment (Lighting Body)

Figure 1:
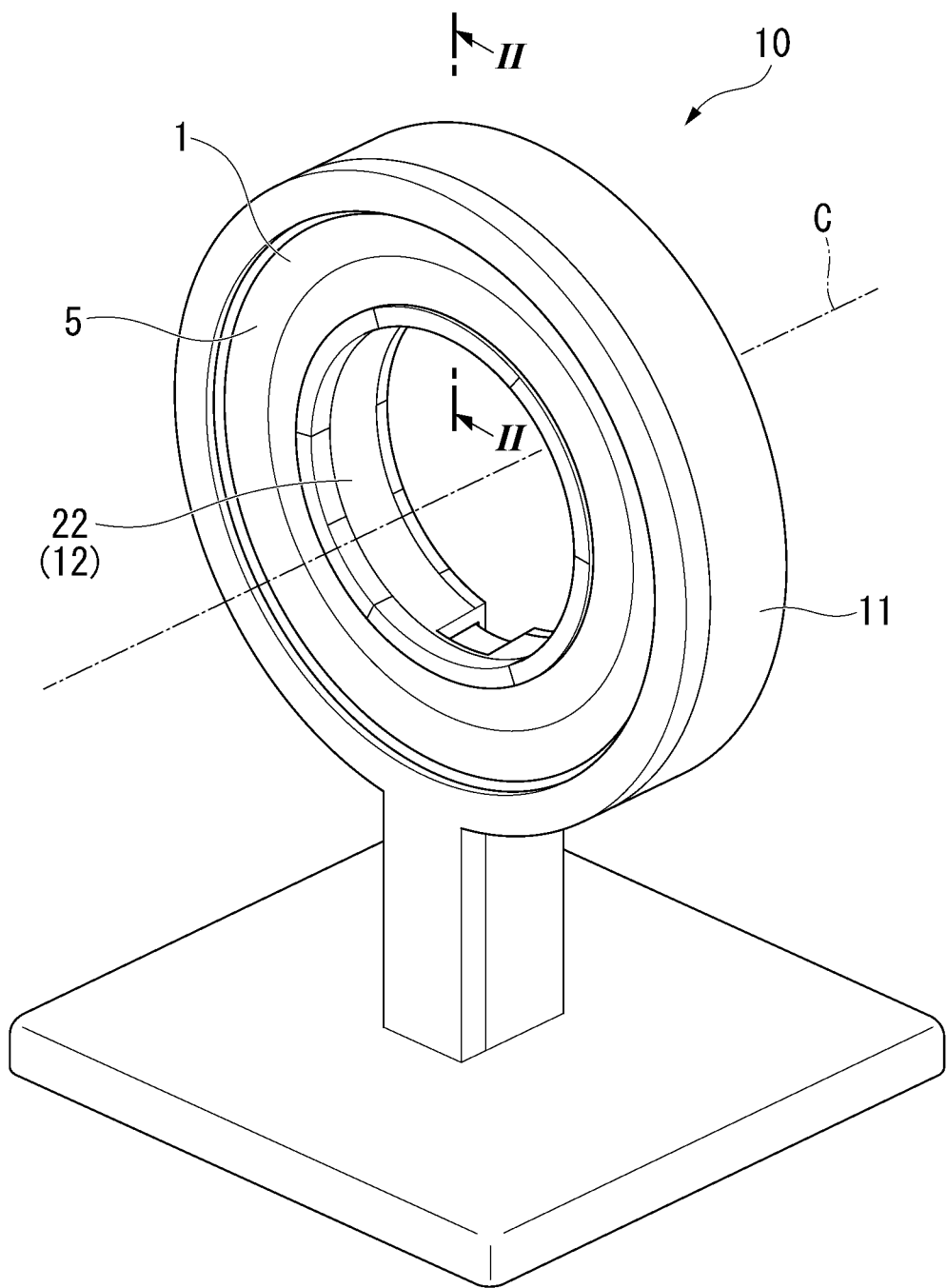
FIG. 1 is an exterior perspective view of a lighting body according to an embodiment.
Figure 2:
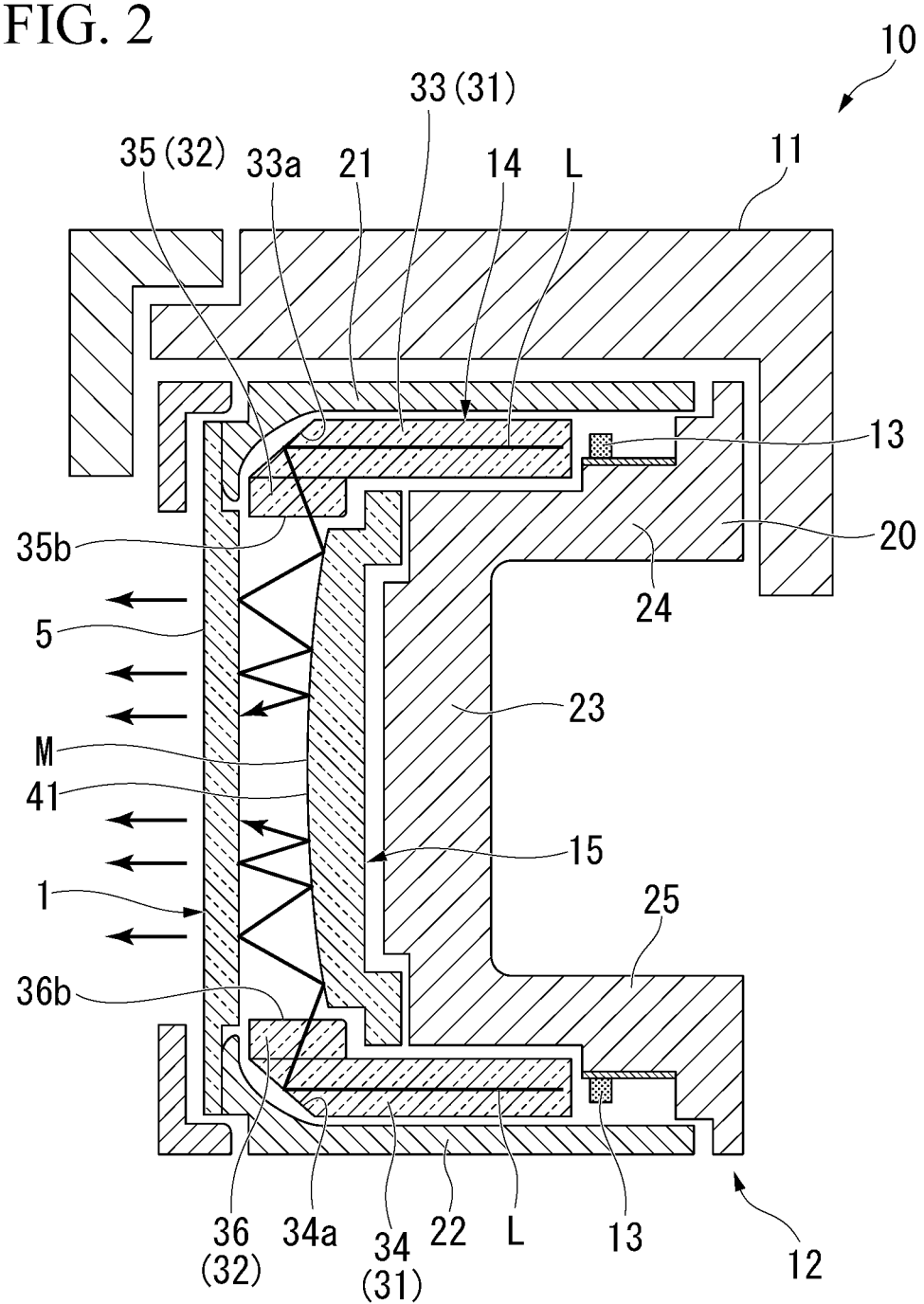
FIG. 2 is a cross-sectional view of the lighting body taken along line II-II of FIG. 1.

FIG. 1 is an exterior perspective view of a lighting body 10 according to an embodiment. FIG. 2 is a cross-sectional view of the lighting body 10 taken along line II-II of FIG. 1.

The lighting body 10 is installed in, for example, a vehicle (not shown). The lighting body 10 is applied to a tail lamp or a brake lamp provided at a rear end portion of the vehicle. As shown in FIG. 1, the lighting body 10 is formed in an annular shape in which the lighting body 10 has an axis C as a center thereof in a forward/rearward direction of the vehicle. In the following description, a direction along the axis C of the lighting body 10 may be simply referred to as an "axial direction," a direction orthogonal to the axis C may be simply referred to as a "radial direction," and a direction around the axis C may be simply referred to as a "circumferential direction" in some cases. An irradiation direction of light in the axial direction may be referred to as a "rearward direction in the axial direction" and the direction opposite thereto may be referred to as a "forward direction in the axial direction" in some cases.

As shown in FIG. 2, the lighting body 10 includes a case 11, a base 12, a half mirror 1, light sources 13, a light guide body 14, and a reflector 15.

The case 11 is formed in an annular shape in which the case 11 has the axis C as a center thereof. The case 11 forms an outer circumferential portion of the lighting body 10.

The base 12 is arranged further inward in the radial direction than the case 11. The base 12 includes a main base 20, an outer sub-base 21, and an inner sub-base 22.

The main base 20 is formed in an annular shape in which the main base 20 has the axis C as a center thereof. The main base 20 is formed in a U shape in which the main base 20 protrudes rearward in the axial direction in a cross-sectional view (a cross-sectional view of FIG. 2) when viewed from the radial direction. To be specific, the main base 20 includes a bottom wall 23, an outer wall 24, and an inner wall 25. The bottom wall 23 faces the axial direction and is formed in an annular shape. The outer wall 24 is joined to an outer circumferential portion of the bottom wall 23 and extends forward in the axial direction. The inner wall 25 is joined to an inner circumferential portion of the bottom wall 23 and extends forward in the axial direction. The main base 20 formed in this way forms a forward portion of the lighting body 10 in the axial direction.

The outer sub-base 21 is arranged between the outer wall 24 of the main base 20 and the case 11 in the radial direction. The outer sub-base 21 extends in the axial direction. The outer sub-base 21 is formed in an annular shape in which the outer sub-base 21 has the axis C as the center thereof.

The inner sub-base 22 is formed in an annular shape in which the inner sub-base 22 has an outer diameter smaller than that of the outer sub-base 21. The inner sub-base 22 is arranged further inward in the radial direction than the inner wall 25 of the main base 20. The inner sub-base 22 extends in the axial direction. The inner sub-base 22 is provided coaxially with the axis C. The inner sub-base 22 forms an inner circumferential portion of the lighting body 10.

The lighting body 10 is formed using the case 11, the main base 20, and the inner sub-base 22 in an annular frame shape in which the lighting body 10 opens rearward. Part of the case 11 which forms the outer circumferential portion of the lighting body 10 extends in the radial direction and is connected to a vehicle body. Thus, the lighting body 10 is attached to the vehicle body.

The half mirror 1 closes an opening formed using the case 11, the main base 20, and the inner sub-base 22. The half mirror 1 is formed in an annular shape in which the half mirror 1 has the axis C as a center thereof. The half mirror 1 forms a rearward portion of the lighting body 10 in the axial direction. A surface of the half mirror 1 facing rearward in the axial direction is a light emitting surface 5.

Figure 3:
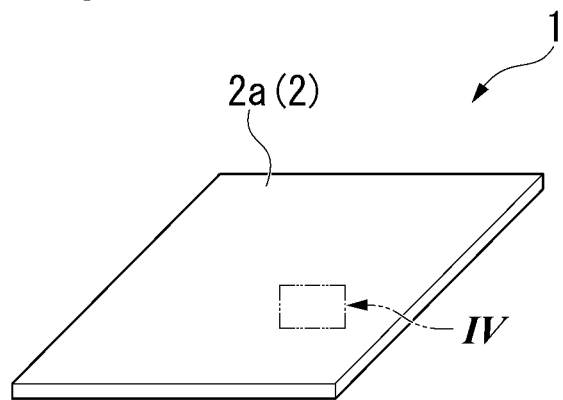
FIG. 3 is an exterior perspective view of a half mirror according to the embodiment.
Figure 4:
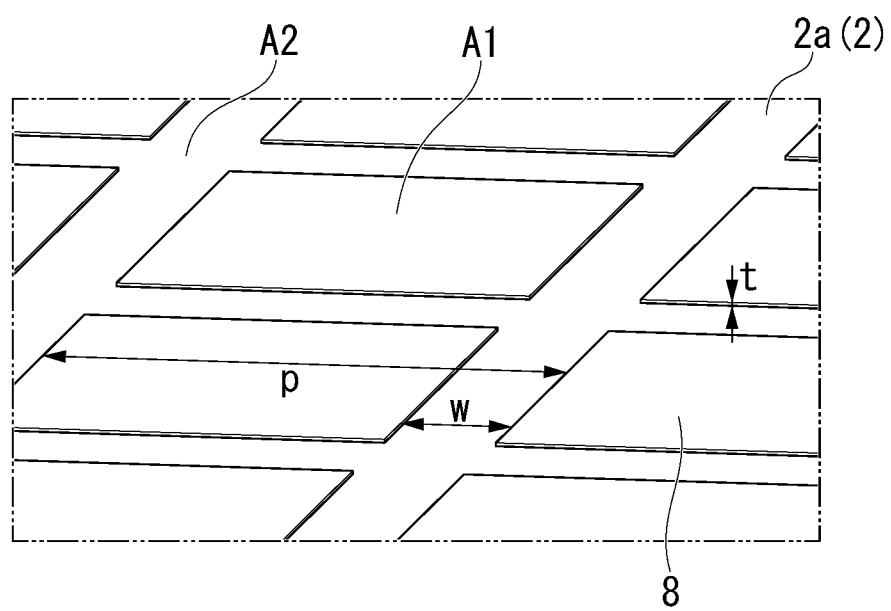
FIG. 4 is an enlarged view of portion IV of FIG. 3.

FIG. 3 is an exterior perspective view of the half mirror 1 according to the embodiment. FIG. 4 is an enlarged view of portion IV of FIG. 3.

The half mirror 1 has a plating 8 (refer to FIG. 4) formed by vapor-depositing a metal material on a predetermined region of a surface 2a of a transparent plate 2. The transparent plate 2 is, for example, a glass plate or the like. A material of the plating 8 is, for example, a metal material or the like containing aluminum.

As shown in FIG. 4, the half mirror 1 has reflection regions A1 formed using the plating 8 vapor-deposited on the transparent plate 2 and transmission regions A2 from which the plating 8 is removed. The respective transmission regions A2 are formed in a lattice shape. The reflection region A1 is provided between the transmission regions A2. Each of the reflection regions A1 is formed in a rectangular shape. The half mirror 1 is set to have a desired transmittance and reflectance by setting a pitch p of neighboring reflection regions A1, a width w of the transmission region A2, and a thickness t of the plating 8 to have predetermined values. In this embodiment, the pitch p of the reflection regions A1 is less than 2 mm (p<2 mm). The width w of the transmission region A2 is less than 0.4 mm (w<0.4 mm).

Referring to FIG. 2 again, the half mirror 1 is arranged to face the reflector 15 which will be described in detail later. The half mirror 1 reflects part of the light L reflected by the reflector 15 and the remaining part of the reflected light L is transmitted toward the light emitting surface 5 side through the half mirror 1. That is to say, the half mirror 1 reflects the light of the light L reflected by the reflector 15 incident on the reflection region A1 again toward the reflector 15 side. The light of the light L reflected by the reflector 15 incident on the transmission region A2 is transmitted through the half mirror 1 and the half mirror 1 causes the light emitting surface 5 to emit light.

The light sources 13, the light guide body 14, and the reflector 15 are arranged in a space surrounded by the half mirror 1, the case 11, the main base 20, and the inner sub-base 22 formed in this way.

The light sources 13 are, for example, an LED, a laser, or the like. The light sources 13 are arranged in a space between the outer wall 24 of the main base 20 and the outer sub-base 21 and in a space between the inner wall 25 of the main base 20 and the inner sub-base 22. The light sources 13 are attached to the outer wall 24 and the inner wall 25 of the main base 20. Each of the light sources 13 emits light L rearward in the axial direction. The plurality of light sources 13 are provided at intervals in the circumferential direction. The light source 13 attached to the outer wall 24 and the light source 13 attached to the inner wall 25 are provided at positions in which they correspond to each other in the circumferential direction.

The light guide body 14 guides the light L from the light source 13 to cause the light emitting surface 5 located further rearward in the axial direction than the light source 13 to emit light. The light guide body 14 includes a first light guide lens 31 and a second light guide lens 32.

The first light guide lens 31 is provided at a position which is further rearward in the axial direction than the light source 13 and is equivalent to that of the light source 13 in the radial direction. To be specific, the first light guide lens 31 includes an outer first light guide lens 33 and an inner first light guide lens 34.

The outer first light guide lens 33 is formed in a tubular shape in which the outer first light guide lens 33 has the axis C as a center thereof. The outer first light guide lens 33 is arranged between the outer wall 24 of the main base 20 and the outer sub-base 21. The outer first light guide lens 33 extends in the axial direction. The outer first light guide lens 33 guides light L from the light source 13 attached to the outer wall 24 of the main base 20 toward a rearward direction.

The inner first light guide lens 34 is formed in a tubular shape in which the inner first light guide lens 34 has the axis C as a center thereof. The inner first light guide lens 34 is arranged between the inner wall 25 of the main base 20 and the inner sub-base 22. The inner first light guide lens 34 extends in the axial direction. The inner first light guide lens 34 guides light L from the light source 13 attached to the inner wall 25 of the main base 20 toward a rearward direction.

Light guide reflecting surfaces 33a and 34a are formed at end portions of the outer first light guide lens 33 and the inner first light guide lens 34 opposite to the light source 13. The light guide reflecting surfaces 33a and 34a are inclined by about 45° with respect to the axial direction.

The first light guide lens 31 formed in this way diffuses or converges light L from the light source 13 to display grid-shaped light in the radial direction on the light emitting surface 5.

The second light guide lens 32 is provided at a rear end portion of the first light guide lens 31 in the axial direction. The length of the second light guide lens 32 in the axial direction is shorter than the length of the first light guide lens 31 in the axial direction. The second light guide lens 32 includes an outer second light guide lens 35 and an inner second light guide lens 36.

The outer second light guide lens 35 is provided further inward in the radial direction than the outer first light guide lens 33. The outer second light guide lens 35 is arranged to be in contact with the outer first light guide lens 33. Light L from the light source 13 transmitted through the outer first light guide lens 33 is incident on the outer second light guide lens 35. The outer second light guide lens 35 has a light guide emitting surface 35b. The light guide emitting surface 35b is provided on a surface of the outer second light guide lens 35 facing inward in the radial direction. The light guide emitting surface 35b emits light L incident on the outer second light guide lens 35 from the outer first light guide lens 33 inward in the radial direction and toward the reflector 15 side.

The inner second light guide lens 36 is provided further outward in the radial direction than the inner first light guide lens 34. The inner second light guide lens 36 is arranged to be in contact with the inner first light guide lens 34. Light L from the light source 13 transmitted through the inner first light guide lens 34 is incident on the inner second light guide lens 36. The inner second light guide lens 36 has a light guide emitting surface 36b. The light guide emitting surface 36b is provided on a surface of the inner second light guide lens 36 facing outward in the radial direction. The light guide emitting surface 36b emits light L incident on the inner second light guide lens 36 from the inner first light guide lens 34 outward in the radial direction and toward the reflector 15 side.

The outer second light guide lens 35 and the inner second light guide lens 36 are arranged apart from each other in the radial direction.

The reflector 15 is provided between the half mirror 1 and the main base 20 in the axial direction. The reflector 15 is attached to the bottom wall 23 of the main base 20. The reflector 15 is formed in an annular shape in which the reflector 15 has the axis C as the center thereof. The reflector 15 is arranged to face the half mirror 1. The reflector 15 is provided at an interval from the half mirror 1. The second light guide lens 32 is arranged between the reflector 15 and the half mirror 1. The reflector 15 is provided over the inner first light guide lens 34 and the outer first light guide lens 33 in the radial direction.

A surface of the reflector 15 facing rearward in the axial direction is a convex curved surface 41. The convex curved surface 41 is formed to be convex toward the half mirror 1 side. The convex curved surface 41 is curved to protrude furthest axially rearward at an intermediate section M between the inner first light guide lens 34 and the outer first light guide lens 33 in the radial direction. Thus, a separation length between the reflector 15 and the half mirror 1 gradually changes in the radial direction. The convex curved surface 41 of the reflector 15 totally reflects light L emitted from the light guide emitting surfaces 35b and 36b of the light guide body 14 toward the light emitting surface 5 side.

(Optical Path)

An optical path until light L emitted from the light source 13 reaches the light emitting surface 5 in the above-described lighting body 10 will be described below.

First, light L is emitted rearward in the axial direction from the light source 13. The light L emitted from the light source 13 is guided using the first light guide lens 31 in the axial direction and the circumferential direction. The light L guided in the axial direction or the circumferential direction is reflected by the light guide reflecting surfaces 33a and 34a of the first light guide lens 31. At this time, the light guide reflecting surfaces 33a and 34a change a direction in which the light L guided from the light source 13 in the axial direction travels to a direction in a direction intersecting the axial direction. The direction intersecting the axial direction is a direction in which the light is incident on the reflector 15 from diagonally rearward in an angular range between a direction toward the bottom wall 23 side of the main base 20 in the radial direction and a direction toward the front side in the axial direction.

The light L emitted from the first light guide lens 31 is incident on the second light guide lens 32 which is arranged in contact with the first light guide lens 31. After that, the light L is emitted obliquely forward from the light guide emitting surfaces 35b and 36b of the second light guide lens 32 and reaches the reflector 15.

Subsequently, the light L is totally reflected by the reflector 15 toward the half mirror 1 side. Part of the light L which has been totally reflected by the reflector 15 and has reached the half mirror 1 is transmitted through the transmission region A2 of the half mirror 1, reaches the light emitting surface 5, and causes the light emitting surface 5 to emit light. The remaining part of the light L which has been totally reflected by the reflector 15 and has reached the half mirror 1 is reflected by the reflection region A1 of the half mirror 1 and is totally reflected by the reflector 15 again.

Also, the light L is repeatedly reflected between the reflector 15 and the half mirror 1 a plurality of times and causes the light emitting surface 5 to emit light. Thus, it is possible to generate a plurality of optical paths and visually recognize three-dimensional light with a sense of depth. To be specific, all of the light is emitted in a rearward convex shape reflecting the separation length between the convex curved surface 41 of the reflector 15 and the half mirror 1 so that the brightness gradually decreases from both end portions of the lighting body 10 in the radial direction (positions corresponding to a pair of light sources 13) toward the intermediate section M of the convex curved surface 41 in the radial direction.

(Method for Producing Half Mirror)

A method for producing the above-mentioned half mirror 1 will be described below.

In the method for producing the half mirror 1, the transmission region A2 through which light is transmitted and the reflection region A1 by which light is reflected are formed on the surface 2a of the transparent plate 2. Furthermore, the half mirror 1 is produced by forming the plating 8 in which a metal material is vapor-deposited only in the reflection region A1. The method for producing the half mirror 1 includes a masking step, a plating step, a plating removing step, and a masking material removing step.

Figure 5:
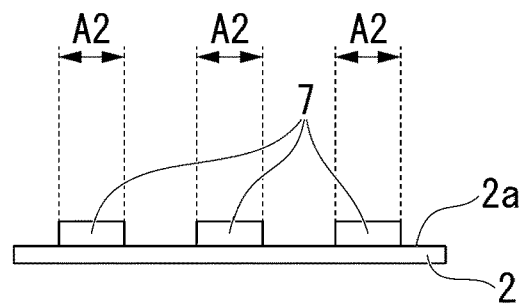
FIG. 5 is a diagram for explaining a masking step in a method for producing a half mirror according to the embodiment.

FIG. 5 is a diagram for explaining the masking step in the method for producing the half mirror 1 according to the embodiment.

First, in the masking step, the surface 2a of the transparent plate 2 is coated with a masking material 7. At this time, a position on the transparent plate 2 corresponding to the transmission region A2 is coated with the masking material 7. The masking material 7 is, for example, a curing tape or the like which can be attached to and detached from the transparent plate 2. The masking material 7 is attached to the transparent plate 2 in a lattice shape. Furthermore, at this time, the width w of the transmission region A2 and the pitch p of the neighboring reflection regions A1 (refer to FIG. 4 with respect to both) are set to predetermined values so that the transmittance of the half mirror 1 has a predetermined value.

Figure 6:
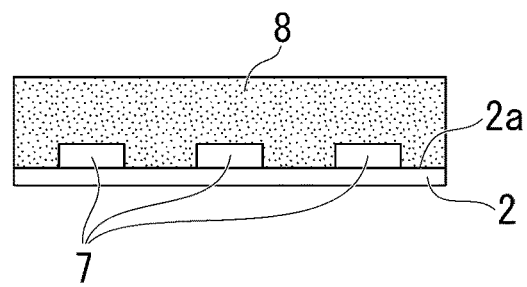
FIG. 6 is a diagram for explaining a plating step in the method for producing a half mirror according to the embodiment.

FIG. 6 is a diagram for explaining the plating step in the method for producing the half mirror 1 according to the embodiment.

In the plating step, after the masking step, the plating 8 is formed by vapor-depositing a metal material on the entire surface 2a of the transparent plate 2 including the transmission regions A2 which have been coated with the masking material 7 and the reflection region A1. In the plating step, the metal material is vapor-deposited so that a thickness of a plated layer is thicker than a thickness of the masking material 7. A method for forming the plating 8 may be, for example, electroless plating or the like.

Figure 7:
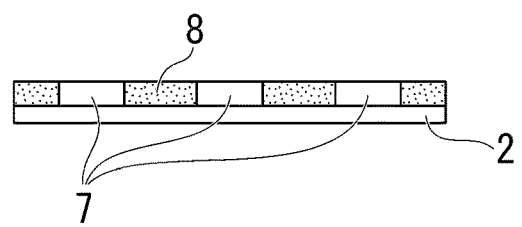
FIG. 7 is a diagram for explaining a plating removing step in the method for producing a half mirror according to the embodiment.

FIG. 7 is a diagram for explaining the plating removing step in the method for producing the half mirror 1 according to the embodiment.

In the plating removing step, after the plating step, the plating 8 is removed to a depth in which the masking material 7 is exposed. To be specific, in the plating removing step, the plating 8 is scraped off by, for example, turning, cutting, or the like using a grinder, a polishing machine, or the like. In the plating removing step, the plating 8 may be removed by, for example, etching processing or the like using a solvent.

Figure 8:
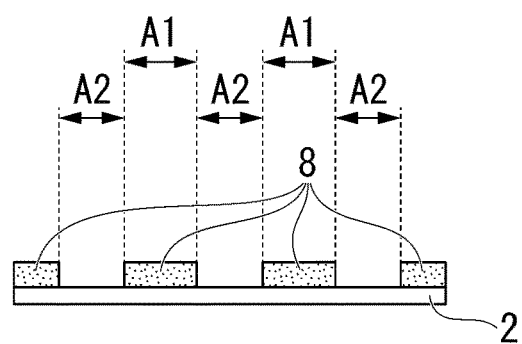
FIG. 8 is a diagram for explaining a masking material removing step in the method for producing a half mirror according to the embodiment.

FIG. 8 is a diagram for explaining the masking material removing step in the method for producing the half mirror 1 according to the embodiment.

In the masking material removing step, after the plating removing step, the masking material 7 is removed. A region from which the masking material 7 has been removed is the transmission region A2 in which the transparent plate 2 has been exposed. Thus, the plating 8 is vapor-deposited only at a position on the transparent plate 2 corresponding to the reflection region A1.

In this way, the half mirror 1 is subjected to the masking step, the plating step, the plating removing step, and the masking material removing step and the production thereof is completed.

(Actions and Effects)

The method for producing the above-described half mirror 1 and actions and effects of the lighting body 10 will be described.

According to the method for producing the half mirror 1 in this embodiment, it is possible to produce the half mirror 1 by forming the plating 8 only on a portion of the surface 2a of the transparent plate 2 corresponding to the reflection region A1. Thus, it is possible to reduce time and effort required to control the film thickness compared with the related art in which the half mirror 1 is produced by controlling a film thickness of the plating 8 formed on the entire surface of the transparent plate 2. It is possible to set the transmittance of the half mirror 1 to a predetermined value by forming the transmission region A2 in a lattice shape and setting the width w of the transmission region A2 and the pitch p of the neighboring reflection region A1 to have predetermined values. Thus, it is possible to easily set the transmittance through a simple method. For example, it is possible to easily set the transmittance of the half mirror 1 by changing the area ratio between the transmission regions A2 and the reflection regions A1.

Therefore, it is possible to provide a method for producing the half mirror 1 in which the transmittance can be easily set and the manufacturability can be improved.

In the method for producing the half mirror 1, the half mirror 1 is produced by being subjected to the masking step, the plating step, the plating removing step, and the masking material removing step. Since the plating 8 may be scraped off to a depth in which the masking material 7 is exposed in the plating removing step, it is not necessary to maintain high processing accuracy at the time of scraping the plating 8. Thus, it is possible to simplify a manufacturing device and to easily perform an operation compared with the related art in which highly accurate film thickness control is required. It is possible to produce the half mirror 1 having a predetermined transmittance by changing an area of a region coated with the masking material 7 (that is, the next transmission region A2). Thus, it is possible to provide a method for producing the half mirror 1 in which the transmittance can be easily set and the manufacturability can be improved.

According to the lighting body 10 in this embodiment, the lighting body 10 includes the half mirror 1 produced through the method for producing the half mirror 1 described above, the light source 13, the light guide body 14, and the reflector 15. Since the half mirror 1 and the reflector 15 are arranged to face each other, light incident on the reflector 15 from the light source 13 via the light guide body 14 is reflected between the reflector 15 and the half mirror 1 a plurality of times. At this time, part of light which has reached the half mirror 1 is transmitted through the transmission region A2 and causes the light emitting surface 5 to emit light. Part of the remaining light which has reached the half mirror 1 is reflected by the reflection region A1 and is reflected by the reflector 15 again. In this way, light is transmitted in the half mirror 1 at a predetermined transmittance and light is reflected between the reflector 15 and the half mirror 1 a plurality of times. Thus, it is possible to provide a sense of depth to light displayed on the light emitting surface 5. Therefore, it is possible to provide the lighting body 10 which includes the half mirror 1 produced through the method for producing the half mirror 1 in which the transmittance can be easily set and the manufacturability can be improved and in which a sense of depth can be effectively expressed.

The technical scope of the present invention is not limited to the above-described embodiment and various modifications are possible without departing from the gist of the present invention.

For example, although a constitution in which the transparent plate 2 is a glass plate has been described in this embodiment, the present invention is not limited thereto. For example, the transparent plate 2 may be formed of a resin material such as an acrylic material and a polycarbonate material.

The lighting body 10 may be used as the lighting body 10 other than the tail lamp of the vehicle.

A material of the masking material 7 and a material of the plating 8 are not limited to those of the embodiment described above. A plating method may be appropriately changed in accordance with materials of the transparent plate 2 and the plating 8.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Half mirror
2 Transparent plate
2a Surface
5 Light emitting surface
7 Masking material
8 Plating
10 Lighting body
13 Light source
14 Light guide body
15 Reflector
A1 Reflection region
A2 Transmission region
L Light
p Pitch
w Width (of transmission region)

What is claimed is:
1. A lighting body, comprising:
half mirror having a light emitting surface at a light emitting surface side of the half mirror;
a light source;
a light guide body configured to guide light from the light source to cause the light emitting surface to emit light; and a reflector arranged to face the half mirror and configured to reflect the light toward the light emitting surface side, wherein the half mirror has a transparent plate with a reflection region by which light is reflected and a transmission region through which the light is transmitted on a surface of a transparent plate;

wherein the transmission region is formed by a plurality of vertical lines and a plurality of horizontal lines in a grid pattern, and the reflection region is provided in the portion surrounded by the plurality of vertical lines and horizontal lines, wherein the half mirror is formed by:
- a masking step of coating a position of the transparent plate corresponding to the transmission region with a masking material;
- a plating step of coating the entire surface which includes the transmission region which has been coated with the masking material and the reflection region with the plating, with the plating thicker than the masking material;
- a plating removing step of removing the plating to a depth in which the masking material is exposed after the plating step; and
- a masking material removing step of removing the masking material after the plating removing step, wherein the reflector is provided at an interval from the half mirror, and a surface of the reflector facing the half mirror side is formed to be convex toward the half mirror side.

2. A lighting body, comprising:

half mirror having a light emitting surface at a light emitting surface side of the half mirror;

a light source;

a light guide body configured to guide light from the light source to cause the light emitting surface to emit light; and a reflector arranged to face the half mirror and configured to reflect the light toward the light emitting surface side, wherein the half mirror has a transparent plate with a reflection region by which light is reflected and a transmission region through which the light is transmitted on a surface of a transparent plate; and wherein the transmission region is formed by a plurality of vertical lines and a plurality of horizontal lines in a grid pattern, and the reflection region is provided in the portion surrounded by the plurality of vertical lines and horizontal lines, wherein the transmission region is formed in a lattice shape and a width of the transmission region and a pitch of neighboring reflection regions are set to predetermined values so that the transmittance of the half mirror has a predetermined value, wherein the half mirror is formed by:
- a masking step of coating a position of the transparent plate corresponding to the transmission region with a masking material;
- a plating step of coating the entire surface which includes the transmission region which has been coated with the masking material and the reflection region with the plating, with the plating thicker than the masking material;
- a plating removing step of removing the plating to a depth in which the masking material is exposed after the plating step; and
- a masking material removing step of removing the masking material after the plating removing step, wherein the reflector is provided at an interval from the half mirror, and a surface of the reflector facing the half mirror side is formed to be convex toward the half mirror side.

* * * * *